US010065870B2

United States Patent
Atieh et al.

(10) Patent No.: US 10,065,870 B2
(45) Date of Patent: *Sep. 4, 2018

(54) METHOD FOR REMOVING BENZENE FROM CONTAMINATED AQUEOUS SOLUTIONS

(71) Applicant: King Fahd University of Petroleum and Minerals, Dhahran (SA)

(72) Inventors: Muataz Ali Atieh, Dhahran (SA); Aamir Abbas, Dhahran (SA); Basim Ahmed Abussaud, Dhahran (SA)

(73) Assignee: King Fahd Unversity of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,069

(22) Filed: Feb. 21, 2018

(65) Prior Publication Data
US 2018/0179085 A1 Jun. 28, 2018

Related U.S. Application Data

(63) Continuation of application No. 14/842,351, filed on Sep. 1, 2015, now Pat. No. 9,988,286.

(51) Int. Cl.
*C02F 1/28* (2006.01)
*B01J 20/20* (2006.01)
(Continued)

(52) U.S. Cl.
CPC .............. *C02F 1/288* (2013.01); *B01J 20/06* (2013.01); *B01J 20/08* (2013.01); *B01J 20/205* (2013.01);
(Continued)

(58) Field of Classification Search
CPC .... C02F 1/281; C02F 1/288; C02F 2101/322; C02F 2103/365; C02F 2103/38;
(Continued)

(56) References Cited

U.S. PATENT DOCUMENTS 9,296,625 B2 3/2016 Bakather
9,988,286 B2 * 6/2018 Atieh ...................... C02F 1/288
(Continued)

FOREIGN PATENT DOCUMENTS

KR 10-1082932 B1 11/2011

OTHER PUBLICATIONS

Bina, et al., "Water and wastewater treatment from BTEX by carbon nanotubes and nano-Fe," vol. 41, Issue 6, Nov. 2014 (Abstract only).
(Continued)

*Primary Examiner* — Matthew O Savage
(74) *Attorney, Agent, or Firm* — Oblon, McClelland, Maier & Neustadt, L.L.P.

(57) ABSTRACT

Methods and nanocomposites for the adsorptive removal of aromatic hydrocarbons such as benzene, toluene, ethyl benzene and xylene from contaminated water sources and systems are provided. The nanocomposites contain carbon nanotubes and metal oxide nanoparticles such as $Al_2O_3$, $Fe_2O_3$ and ZnO impregnated on a surface and/or in pore spaces of the carbon nanotubes. Methods of preparing and characterizing the nanocomposite adsorbents are also provided.

9 Claims, 8 Drawing Sheets

(51) Int. Cl.
  *B01J 20/06* (2006.01)
  *B01J 20/08* (2006.01)
  *B01J 20/28* (2006.01)
  *B01J 20/32* (2006.01)
  *C02F 101/32* (2006.01)
  *C02F 103/36* (2006.01)
  *C02F 103/38* (2006.01)

(52) U.S. Cl.
  CPC ..... *B01J 20/28061* (2013.01); *B01J 20/3295* (2013.01); *C02F 1/281* (2013.01); *C02F 2101/322* (2013.01); *C02F 2103/365* (2013.01); *C02F 2103/38* (2013.01); *C02F 2305/08* (2013.01)

(58) Field of Classification Search
  CPC ........ C02F 2305/08; B01J 20/06; B01J 20/08; B01J 20/205; B01J 20/28061; B01J 20/3295
  See application file for complete search history.

(56) References Cited

U.S. PATENT DOCUMENTS

2017/0044025 A1* 2/2017 Abussaud ............... C02F 1/288
2017/0165635 A1   6/2017 Abbas

OTHER PUBLICATIONS

Bina, et al., "Benzene and Toluene Removal by Carbon Nanotubes from Aqueous Solution," vol. 38, 2012, pp. 3-25.
Wang et al, Preparation of alumina supported on carbon nanotubes and its application in fluoride adsorption from an aqueous solution, May 2002, Chinese Science Bulletin, vol. 47, No. 9, pp. 722-724.

* cited by examiner

METHOD FOR REMOVING BENZENE FROM CONTAMINATED AQUEOUS SOLUTIONS

CROSS-REFERENCE TO RELATED APPLICATIONS

The present application is a Continuation of Ser. No. 14/842,351, now allowed, having a filing date of Sep. 1, 2015, the entire contents of which are incorporated herein by reference.

BACKGROUND OF THE INVENTION

Technical Field

The present disclosure relates to methods and nanocomposites for the removal of aromatic hydrocarbons from contaminated water sources and systems. More particularly, the present disclosure relates to a nanocomposite containing metal oxide nanoparticle impregnated carbon nanotubes, a process for producing the nanocomposite and methods of treating contaminated water sources with the nanocomposite to adsorb and remove aromatic hydrocarbons.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Benzene, toluene, ethyl benzene and xylene (collectively referred to as BTEX) are established aromatic hydrocarbon contaminants of water sources. These compounds are classified as flammable, toxic, carcinogenic and/or mutagenic [W. J. Deutsch and R. Siegel, *Groundwater Geochemistry: Fundamentals and Applications to Contamination*. CRC Press, 1997, p. 232; and C. Kent, *Basics of Toxicology*, vol. 13. John Wiley & Sons, 1998, p. 194.—each incorporated herein by reference in its entirety]. Thus, their presence in aqueous solution is a significant environmental concern, even at low concentrations. The health effects these pollutants cause in humans include disturbance of the kidney, liver and blood systems, skin and sensory irritation, respiratory problems, cancer, leukemia, and central nervous system depression. As a result of these health concerns, the U.S. EPA has set a maximum contaminant level of 5 µg/L for benzene in drinking water and the U.S. Public Health Service has recommended no more than 2 mg/L of toluene in water for lifetime exposure.

These compounds are widely used in several chemical production and manufacturing processes including petroleum refiners, as well as the polymer, plastic and paint industries as solvent, a natural fraction of petroleum and as precursors for the manufacturing of different chemicals. Water draining from these industries is highly contaminated with BTEX and the pollutants must be removed before water is discharged from any of these industrial facilities [J. A. Kent, *Kent and Riegel's Handbook of Industrial Chemistry and Biotechnology: Vol. 1*. Springer Science & Business Media, 2010, p. 391; and John J. McKetta Jr, *Encyclopedia of Chemical Processing and Design: Volume 67-Water and Wastewater Treatment: Protective Coating Systems to Zeolite*. CRC Press, 1999, p. 289.—each incorporated herein by reference in its entirety]. Further, the pollutants are frequently found in groundwater due to inadvertent spills during production and/or transportation, leaks in underground storage tanks and pipelines, leaching from landfills and improper waste disposal practices. These pollutants migrate easily in the water system, with little or no tendency of being confined near the origin of contamination.

There have been many studies aimed at the removal of aromatic hydrocarbons such as benzene from water. The reported remediation methods include wet air oxidation [B. A. Abussaud, N. Ulkem, D. Berk, and G. J. Kubes, "Wet Air Oxidation of Benzene," *Ind. Eng. Chem. Res.*, vol. 47, no. 514, pp. 4325-4331, 2008.—incorporated herein by reference in its entirety], photo catalytic degradation [M. Bahmani, V. Bitarafhaghighi, K. Badr, P. Keshavarz, and D. Mowla, "The photocatalytic degradation and kinetic analysis of BTEX components in polluted wastewater by UV/$H_2O_2$-based advanced oxidation," *Desalin. Water Treat.*, vol. 52, no. 16-18, pp. 3054-3062, May 2013; and M. N. Chong, B. Jin, C. W. K. Chow, and C. Saint, "Recent developments in photocatalytic water treatment technology: a review," *Water Res.*, vol. 44, no. 10, pp. 2997-3027, May 2010.—each incorporated herein by reference in its entirety], and adsorption using various materials [I. Ali and V. K. Gupta, "Advances in water treatment by adsorption technology," *Nat. Protoc.*, vol. 1, no. 6, pp. 2661-7, January 2006.—incorporated herein by reference in its entirety]. However, each technique is characterized by its inherent limitations, which create the continuous need for improvements in methods for the removal of aromatic hydrocarbons such as BTEX from contaminated water sources.

Adsorption has become one of the most promising and increasingly practiced industrial techniques for removing aromatic hydrocarbons such as benzene from water using such varied absorbents as sand, peat and activated carbon [Y. Kalmykova, N. Moona, A.-M. Strömvall, and K. Björklund, "Sorption and degradation of petroleum hydrocarbons, polycyclic aromatic hydrocarbons, alkylphenols, bisphenol A and phthalates in landfill leachate using sand, activated carbon and peat filters," *Water Res.*, vol. 56, no. 0, pp. 246-57, June 2014; and N. Wibowo, L. Setyadhi, D. Wibowo, J. Setiawan, and S. Ismadji, "Adsorption of benzene and toluene from aqueous solutions onto activated carbon and its acid and heat treated forms: influence of surface chemistry on adsorption," *J. Hazard. Mater.*, vol. 146, no. 1-2, pp. 237-42, July 2007; and C. L. Mangun, Z. Yue, J. Economy, S. Maloney, P. Kemme, and D. Cropek, "Adsorption of Organic Contaminants from Water Using Tailored ACFs," no. June 1996, pp. 2356-2360, 2001.—each incorporated herein by reference in its entirety].

Carbon nanotubes (CNTs) have attracted great interest as adsorbents because of their unique chemical structure and intriguing electrical, mechanical and physical properties facilitating the adsorption of different chemicals including organic, inorganic and biological materials [W. Chen, L. Duan, and D. Zhu, "Adsorption of Polar and Nonpolar Organic Chemicals to Carbon Nanotubes," *Environ. Sci. Technol.*, vol. 41, no. 24, pp. 8295-8300, December 2007; and V. K. Gupta, S. Agarwal, and T. a Saleh, "Chromium removal by combining the magnetic properties of iron oxide with adsorption properties of carbon nanotubes," *Water Res.*, vol. 45, no. 6, pp. 2207-12, March 2011.—each incorporated herein by reference in its entirety]. These carbon nanotubes have high surface areas, are easily modified on their surface to aid adsorption, and are especially well-suited to waste water treatment [O. G. Apul and T. Karanfil, "Adsorption of Synthetic Organic Contaminants by Carbon Nanotubes: A Critical Review," *Water Res.*, vol. 68, pp. 34-55, October 2014; and X. Qu, P. J. J. Alvarez, and Q. Li, "Applications of nanotechnology in water and wastewater treatment," *Water Res.*, vol. 47, no. 12, pp. 3931-3946, August 2013; and X. Liu, M. Wang, S. Zhang, and B. Pan, "Application potential of carbon nanotubes in water treatment: A review," *J. Environ. Sci.*, vol. 25, no. 7, pp. 1263-1280, July 2013.—each incorporated herein by reference in its entirety].

Despite many studies indicating that CNTs have a high affinity for adsorbing organic chemicals and the potential for developing carbon nanotubes for BTEX water treatment and removal [C.-J. M. Chin, M.-W. Shih, and H.-J. Tsai, "Adsorption of nonpolar benzene derivatives on single-walled carbon nanotubes," *Appl. Surf. Sci.*, vol. 256, no. 20, pp. 6035-6039, August 2010; and F. Tournus and J.-C. Charlier, "Ab initio study of benzene adsorption on carbon nanotubes," *Phys. Rev. B*, vol. 71, no. 16, p. 165421, April 2005; and Y. Liu, J. Zhang, X. Chen, J. Zheng, G. Wang, and G. Liang, "Insights into the adsorption of simple benzene derivatives on carbon nanotubes," *RSC Adv.*, vol. 4, no. 101, pp. 58036-58046, October 2014—each incorporated herein by reference in its entirety] there remains many possibilities for developing different types of carbon nanotubes with different morphologies [S. Iijima, "Helical microtubules of graphitic carbon," *Nature*, vol. 354, no. 6348, pp. 56-58, 1991.—incorporated herein by reference in its entirety] and functionalization for enhancing their affinity for specific contaminants and improving their removal efficiencies as adsorbents.

Surface modification of carbon nanotubes to enhance BTEX adsorption from aqueous solutions has proven effective. For example, Su et al. employed multi-walled carbon nanotubes (MWCNTs) that were oxidized by sodium hypochlorite (NaOCl) solution to enhance the adsorption of benzene and toluene from aqueous solution [F. Su, C. Lu, and S. Hu, "Adsorption of benzene, toluene, ethylbenzene and p-xylene by NaOCl-oxidized carbon nanotubes," *Colloids Surfaces A Physicochem. Eng. Asp.*, vol. 353, no. 1, pp. 83-91, January 2010.—incorporated herein by reference in its entirety]. NaOCl-oxidized CNTs have superior adsorption performance compared with many types of carbon and silica adsorbents previously reported in the literature. The work has been extended to additional aromatic hydrocarbons including xylene and ethyl benzene [F. Yu, J. Ma, and Y. Wu, "Adsorption of toluene, ethylbenzene and xylene isomers on multi-walled carbon nanotubes oxidized by different concentration of NaOCl," *Front. Environ. Sci. Eng. China*, vol. 6, no. 3, pp. 320-329, June 2011.—incorporated herein by reference in its entirety].

In view of the foregoing, it will be advantageous to design methods, composites and processes for economically producing those composites that can efficiently and at a low cost treat aromatic hydrocarbon contaminated water. One object of the present disclosure is to provide a metal oxide nanoparticle impregnated carbon nanotube nanocomposite for adsorptive removal of these pollutants.

BRIEF SUMMARY OF THE INVENTION

According to a first aspect, the present disclosure relates to a method for removing at least one aromatic hydrocarbon from an aqueous solution including contacting a nanocomposite comprising carbon nanotubes and metal oxide nanoparticles with the aqueous solution, to adsorb the aromatic hydrocarbon from the aqueous solution, wherein the metal oxide nanoparticles are impregnated on a surface and/or in pore spaces of the carbon nanotubes.

In one embodiment, the metal oxide is at least one selected from the group consisting of aluminum oxide, zinc oxide and iron oxide.

In one embodiment, the carbon nanotubes are at least one selected from the group consisting of multi-walled carbon nanotubes, single-walled carbon nanotubes and hybrid nanotubes.

In one embodiment, the aromatic hydrocarbon is at least one selected from the group consisting of benzene, toluene, ethyl benzene and xylene.

In one embodiment, the carbon nanotubes are present in the nanocomposite in at least 85% by weight relative to the total weight of the nanocomposite and the metal oxide nanoparticles are present in the nanocomposite in up to 15% by weight relative to the total weight of the nanocomposite.

In one embodiment, the metal oxide nanoparticles have an average particle size of 5-40 nm.

In one embodiment, the carbon nanotubes have an average outer diameter in the range of 5-75 nm and an average inner diameter in the range of 0.5-50 nm.

In one embodiment, the nanocomposite has a BET surface area of at least 100 $m^2/g$.

In one embodiment, the method further comprises agitating the aqueous solution at a speed of 50-350 rpm during the contacting.

In one embodiment, the method removes at least 25% of the total mass of the aromatic hydrocarbon from the aqueous solution.

In one embodiment, the method removes up to 90% of the total mass of the aromatic hydrocarbon from the aqueous solution.

In one embodiment, the method removes up to 90% of the total mass of the aromatic hydrocarbon and the contacting is carried out for a time of up to 5 hours.

In one embodiment, the nanocomposite is effective at removing at least 25% of the total mass of at least one aromatic hydrocarbon from the aqueous solution in a dosage of 10-200 mg per 1 ppm of aromatic hydrocarbon.

In one embodiment, the contacting increases the adsorption of the aromatic hydrocarbon compared to substantially the same method performed under substantially the same operating conditions without the metal oxide nanoparticles.

In one embodiment, the total mass of the aromatic hydrocarbon removed increases 10-40% compared to substantially the same method performed under substantially the same operating conditions without metal oxide nanoparticles.

According to a second aspect, the present disclosure relates to a nanocomposite for use in the method comprising i) carbon nanotubes which are present in at least 85% by weight relative to the total weight of the nanocomposite and ii) nanoparticles comprising at least one metal oxide selected from the group consisting of aluminum oxide, zinc oxide and iron oxide which are present in up to 15% by weight relative to the total weight of the nanocomposite, wherein the metal oxide nanoparticles are impregnated on a surface and/or in pore spaces of the carbon nanotubes and wherein contacting the nanocomposite to an aqueous solution comprising at least one aromatic hydrocarbon selected from the group consisting of benzene, toluene, ethyl benzene and xylene results in adsorption of at least 25% of the total mass of the aromatic hydrocarbon from the aqueous solution.

In one embodiment, the total mass of the aromatic hydrocarbon removed increases 10-40% compared to substantially the same nanocomposite without metal oxide nanoparticles.

In one embodiment, the nanocomposite has a BET surface area of at least 100 m$^2$/g.

According to a third aspect, the present disclosure relates to a process for forming the nanocomposite comprising i) adding a suspension of a metal salt to a solution of carbon nanotubes to form a reaction mixture ii) sonicating the reaction mixture to form metal oxide impregnated carbon nanotubes iii) drying the metal oxide impregnated carbon nanotubes at a first temperature and iv) calcining the metal oxide impregnated carbon nanotubes at a second temperature to form the nanocomposite.

In one embodiment, the carbon nanotubes are at least one selected from the group consisting of multi-walled carbon nanotubes, single-walled carbon nanotubes and hybrid nanotubes and the metal salt comprises at least one selected from the group consisting of aluminum nitrate, zinc nitrate and iron nitrate.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
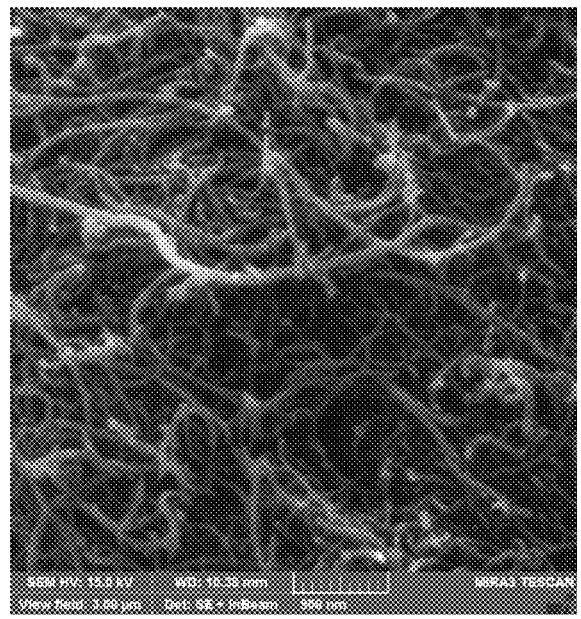
FIG. 1A is a scanning electron microscope (SEM) micrograph of raw multi-walled carbon nanotubes (MWCNTs).

Referring now to the drawings.

The present disclosure is directed to methods, nanocomposites comprising metal oxide nanoparticle impregnated carbon nanotubes and the processes of producing those nanocomposites for removing aromatic hydrocarbons from contaminated water sources and systems. Examples of such water sources and systems include, but are not limited to, surface water that collects on the ground or in a stream, aquifer, river, lake, reservoir or ocean, ground water that is obtained by drilling wells, run-off, industrial water, public water storage towers, public recreational pools and bottled water.

Methods for removing aromatic hydrocarbons according to the present invention include contacting the nanocomposite comprising metal oxide nanoparticle impregnated carbon nanotubes with aromatic hydrocarbon contaminated water sources and systems. These methods may be carried out in tanks, containers or small scale applications.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the individual components.

A nanocomposite is a multiphase solid material where one of the phases has one, two or three dimensions of less than 100 nm, or structures having nano-scale repeat distances between the different phases that make up the material. In the broadest sense this definition can include porous media, colloids, gels and copolymers, but is more usually taken to mean the solid combination of a bulk matrix and a nano-dimensional phase differing in properties due to dissimilarities in structure and chemistry. In general, the mechanical, electrical, thermal, optical, electrochemical and catalytic properties of the nanocomposite will differ from that of the component materials.

According to a first aspect, the present disclosure relates to methods for the removal of aromatic hydrocarbons using nanocomposite based adsorbents. The nanocomposite contains carbon nanotubes and metal oxide nanoparticles, wherein the metal oxide nanoparticles are impregnated on a surface and/or in pore spaces of the carbon nanotubes.

As used herein, "impregnated" describes being completely or partially filled throughout, saturated, permeated and/or infused. The metal oxide nanoparticles may be affixed inside of and/or on an outer surface of the carbon nanotubes. The metal oxide nanoparticles may be affixed on one or more surfaces of the carbon nanotubes. The metal oxide nanoparticles may be affixed to carbon nanotubes in any reasonable manner, such as affixed to one or more surfaces of the carbon nanotubes or alternately, at least partially embedded within the tubular cavity of the carbon nanostructure and/or additional pore spaces.

In one embodiment, from 1-50% of the total volume and/or total surface area of the metal oxide nanoparticle is embedded within the tubular cavity of the carbon nanotube, preferably 5-25%, preferably 10-20%.

In one embodiment, greater than 10% of the surface area (i.e. surface and pore spaces) of the carbon nanotubes are covered by metal oxide nanoparticles and preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99%.

Nanoparticles are particles between 1 and 100 nm in size. A particle is defined as a small object that behaves as a whole unit with respect to its transport and properties. Nanoparticles are named for the real-world shapes that they appear to represent. These morphologies sometimes arise spontaneously as an effect of the synthesis or from the innate crystallographic growth patterns of the materials themselves. Some of these morphologies may serve a purpose, such as bridging an electrical junction.

In one embodiment, the metal oxide nanoparticles of the present disclosure can be synthesized and formed into a variety of morphologies and may refer to nanoparticles, nanocrystals, nanospheres, nanoplatelets, nanowires, nanorods, nanotubes, nanocylinders, nanoboxes, nanostars, tetrapods, nanobelts, nanoflowers, etc. and mixtures thereof.

In one preferred embodiment, the nanocomposite of the present disclosure includes metal oxide nanoparticles comprising at least one selected from the group consisting of aluminum oxide, iron oxide and zinc oxide.

Aluminum oxide is a chemical compound of aluminum and oxygen with the chemical formula $Al_2O_3$. It is commonly called alumina and may also be referred to as aloxide, aloxite or alundum. It is the most commonly occurring of several aluminum oxides and specifically identified as aluminum (III) oxide. It commonly occurs in its crystalline polymorphic phase $\alpha$-$Al_2O_3$ which composes the mineral corundum, the most thermodynamically stable form of aluminum oxide. $Al_2O_3$ is significant in its use to produce aluminum metal and noted for its high melting point.

In the most common and thermodynamically stable form, corundum, the oxygen ions nearly form a hexagonal close-packed structure with aluminum ions filling two-thirds of the octahedral interstices. Each $Al^{3+}$ center is octahedral. In terms of its crystallography, corundum adopts a trigonal Bravais lattice and its primitive cell contains two formula units of aluminum oxide. Aluminum oxide also exists in other phases, including the cubic $\gamma$ and $\eta$ phases, the monoclinic $\theta$ phase, the hexagonal $\chi$ phase, the orthorhombic $\kappa$ phase and the $\delta$ phase the can be tetragonal or orthorhombic. Each has unique crystal structure and properties. In the present disclosure, aluminum oxide may refer to $Al_2O3$ having an $\alpha$ polymorph, a $\gamma$ polymorph, a $\eta$ polymorph, a $\theta$ polymorph, a $\chi$ polymorph, a $\kappa$ polymorph and a $\delta$ polymorph or mixtures thereof.

Iron (III) oxide or ferric oxide is the inorganic compound with formula $Fe_2O_3$. It is one of the three main oxides of iron, the other two being iron (II) oxide (FeO) which is rare, and iron (II,III) oxide ($Fe_3O_4$) which also occurs naturally as the mineral magnetite. As the mineral known as hematite, $Fe_2O_3$ is the main source of iron for the world. $Fe_2O_3$ is ferromagnetic, dark red and readily attack by acids. Iron oxides are widespread in nature, play an important role in many geological and biological processes, and are widely used by humans.

$Fe_2O_3$ can be obtained in various polymorphs. In the major polymorphs, $\alpha$ and $\gamma$, iron adopts an octahedral geometry, each Fe center is bound to six oxygen ligands. $\alpha$-$Fe_2O_3$ has the rhombohedral corundum ($\alpha$-$Al_2O_3$) structure and is the most common form, occurring naturally as the mineral hematite. $\gamma$-$Fe_2O_3$ has a cubic structure, is metastable and converted to the alpha phase at high temperatures. It is also ferromagnetic. Several other phases have been identified, including the $\beta$-phase, which is cubic body centered, metastable, and at temperatures above 500° C. converts to alpha phase, and the epsilon phase, which is rhombic, and shows properties intermediate between alpha and gamma phase. This phase is also metastable, transforming to the alpha phase between 500 and 750° C. Additionally, at high pressure an iron oxide can exist in an amorphous form.

In the present disclosure, iron oxide may refer to $Fe_2O_3$ having an a polymorph, a $\beta$ polymorph, a $\gamma$ polymorph, an $\varepsilon$ polymorph or mixtures thereof.

The iron (III) oxide of the present disclosure may also be in the form of an iron hydrate. When alkali is added to solution of soluble Fe(III) salts a red-brown gelatinous precipitate forms which is $Fe_2O_3.H_2O$ (also written as Fe(O)OH). Several forms of the hydrate oxide of Fe(III) exist as well.

Zinc oxide is an inorganic compound with the formula ZnO. ZnO is a white powder that is insoluble in water and widely used as an additive in numerous materials and products. It occurs naturally as the mineral zincite, but most zinc oxide is produced synthetically. ZnO is a wide-bandgap semiconductor of the II-VI semiconductor group. The native doping of the semiconductor due to oxygen vacancies or zinc interstitials is n-type. As a semiconductor ZnO has several favorable properties including good transparency, high electron mobility, wide bandgap, and strong room-temperature luminescence.

Zinc oxide crystallizes in two main forms, hexagonal wurtzite and cubic zincblende. The wurtzite structure is most stable at ambient conditions and thus most common. In both cases, the zinc and oxide centers are tetrahedral, the most characteristic geometry for Zn (II). Hexagonal and zincblende polymorphs have no inversion symmetry. This and additional lattice symmetry properties result in piezoelectricity of the hexagonal and zincblende ZnO, and pyroelectricity of hexagonal ZnO.

In the present disclosure, zinc oxide may refer to ZnO having a having a hexagonal wurtzite crystal structure, a cubic zincblende crystal structure or mixtures thereof.

In addition to aluminum oxide, iron oxide and zinc oxide, it is envisaged that the present invention may be adapted to incorporate other metal oxide nanoparticles as a part of the nanocomposite for increasing the removal of aromatic hydrocarbons from aqueous solution. Exemplary metal oxide need only be generally of low cost and low toxicity. Examples of other metal oxides include, but are not limited to, oxides of copper, nickel, magnesium, zirconium, titanium, vanadium, rhodium, rhenium, silicon, molybdenum, thorium, chromium, manganese, cerium, silver, lead, cadmium, calcium, antimony, tin, bismuth, cobalt and tungsten and alloys or mixtures thereof.

In one embodiment, the nanocomposite may comprise up to 15% metal oxide nanoparticles by weight relative to the total weight of the nanocomposite, preferably up to 12%, preferably up to 10% by weight relative to the total weight of the nanocomposite.

In one embodiment, the nanocomposite comprises metal oxide nanoparticles with a crystal nanoparticle morphology and an average particle size of 1-50 nm, 1-40 nm, preferably 1-25 nm, more preferably 1-15 nm.

In one embodiment, the nanocomposite of the present disclosure includes carbon nanotubes comprising at least one selected from the group consisting of single-walled carbon nanotubes, multi-walled carbon nanotubes, and hybrid nanotubes.

Carbon nanotubes (CNTs) are allotropes of carbon with a cylindrical nanostructure with a significantly large length-to-diameter ratio (up to 100,000,00:1). These cylindrical carbon molecules have unusual properties, which are valuable for nanotechnology, electronics, optics and other fields of materials science and technology. In particular owing to their extraordinary thermal conductivity and mechanical and electrical properties, carbon nanotubes find applications as additives to various structural materials.

Nanotubes are members of the fullerene structural family. The name refers to their long, hollow structure with the "walls" formed by one-atom-thick sheets of carbon, called graphene. These sheets are rolled at specific and discrete ("chiral") angles, and the combination of the rolling angle and radius determines the nanotube properties. Individual nanotubes naturally align themselves into "ropes" held together by van der Waals forces and pi-stacking. Nanotubes are categorized as single-walled nanotubes (SWNTs) and multi-walled nanotubes (MWNTs).

Single-walled nanotubes typically have a diameter of close to 1 nm and a tube length of up to many millions of times longer. The structure of a single-walled nanotube can be conceptualized by wrapping a one-atom-thick layer of graphite called graphene into a seamless cylinder. In practice, the way the graphene sheet is wrapped is represented by a pair of indices (n, m). The integers n and m denote the number of unit vectors along two directions in the honeycomb crystal lattice of graphene. If m=0, the nanotubes are called zigzag nanotubes, and if n=m, the nanotubes are called armchair nanotubes. Otherwise they are called chiral.

Multi-walled nanotubes consist of multiple rolled layers (concentric tubes) of graphene. There are two models that can be used to describe the structures of multi-walled nanotubes. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in multi-walled nanotubes is close to the distance between graphene layers in graphite. The Russian Doll structure is observed more commonly, its individual shells can be described as SWNTs. Hybrid carbon nanotubes refer to hybrids of MWCNTs and, for example, Silica. They are designed to open the tubes of MWCNTs as a sheet instead of a tube.

In one embodiment, the solid nanocomposite may comprise at least 85% carbon nanotubes by weight relative to the total weight of the nanocomposite, preferably at least 88%, preferably at least 90% by weight relative to the total weight of the nanocomposite.

In one embodiment, the nanocomposite comprises carbon nanotubes with an average outer diameter of 1-75 nm, preferably 5-60 nm, preferably 10-50 nm, preferably 20-40 nm and an average inner diameter of 0.5-50 nm, preferably 0.75-30 nm, preferably 0.8-20, preferably 1.0-10 nm.

In one embodiment, the carbon nanotubes of the nanocomposite are multi-walled carbon nanotubes. The multi-walled carbon nanotubes can adopt the Russian Doll model or the Parchment model or mixtures thereof.

In one embodiment, the carbon nanotubes of the nanocomposite comprise substantially multi-walled carbon nanotubes. The ratio of MWCNTs to SWCNTs is preferably greater than 2:1, preferably greater than 5:1, preferably greater than 10:1, preferably greater than 15:1, preferably greater than 20:1, preferably greater than 25:1, preferably greater than 50:1, preferably greater than 75:1, and preferably greater than 100:1.

In addition to single-walled carbon nanotubes and multi-walled carbon nanotubes it is envisaged that the present invention may be adapted to incorporate other types and related structures of carbon nanotubes including, but not limited to, a carbon nanotorus, a carbon nanobud, a 3D macroscopic carbon nanotube architecture, graphenated carbon nanotubes (g-CNTs), nitrogen-doped carbon nanotubes, a carbon peapod, cup-stacked carbon nanotubes, extreme carbon nanotubes and mixtures thereof.

In one embodiment, the carbon nanotubes of the present disclosure are "raw" or lacking any surface functionalization or modifications. In addition, it is envisaged that the present invention may be adapted to incorporate surface functionalized and/or surface modified carbon nanotubes. These surface modifications may be covalent, non-covalent or mixtures thereof. Examples of functional groups on the carbon nanotubes include alcoholic, carboxylic, aldehydic, ketonic and esteric oxygenated functional groups. Alternatively, the carbon nanotubes of the present disclosure may be surface modified with amine functionality or other functionality that is proton absorbing or basic.

In one embodiment, the raw carbon nanotubes may be treated with an acid such as $HNO_3$, HF, HCl and $H_2SO_4$. The acid treatment may enhance the adsorption properties and affect the pore size and/or surface characteristics of the carbon nanotubes. Alternatively, the raw carbon nanotubes may be treated with a base such as NaOH. The base treatment may enhance the adsorption properties and affect the pore size and/or surface characteristics of the carbon nanotubes.

Adsorption is the adhesion of atoms, ions or molecules from a gas, liquid or dissolved solid to a surface. This process creates a film of the adsorbate on the surface of the adsorbent. This process differs from absorption, in which a fluid (the absorbate) permeates or is dissolved by a liquid or solid (the absorbent). Adsorption is a surface-based process while absorption involves the whole volume of the material. The term sorption encompasses both processes, while desorption is the reverse of it. Adsorption is a surface phenomenon. In one embodiment, the aromatic hydrocarbon is adsorbed onto a surface of nanocomposite during the contacting, whereby the aromatic hydrocarbon adheres to a surface of the carbon nanotube, a surface of metal oxide nanoparticle, or both.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area.

In one embodiment, the raw carbon nanotubes have a BET surface area of at least 50 $m^2/g$, preferably at least 75 $m^2/g$, preferably at least 100 $m^2/g$, preferably at least 150 $m^2/g$, preferably at least 200 $m^2/g$, preferably at least 250 $m^2/g$.

In one embodiment, the modification of carbon nanotubes with impregnated metal oxide nanoparticles may increase the BET surface area of the carbon nanotubes by at least 100%, preferably by at least 125%, preferably by at least 150%, preferably by at least 175%, more preferably by at least 200% or within said ranges.

In one embodiment, the nanocomposite of metal oxide nanoparticle impregnated carbon nanotubes has a BET surface area of at least 100 $m^2/g$, preferably at least 125 $m^2/g$, preferably at least 150 $m^2/g$, preferably at least 200 $m^2/g$, preferably at least 225 $m^2/g$, preferably at least 250 $m^2/g$, preferably at least 275 $m^2/g$, or preferably at least 300 $m^2/g$.

In one embodiment, BET specific surface area measurements of prepared nanocomposite based adsorbents can be determined by $N_2$ adsorption analysis and physical adsorption of $N_2$ carried out in a liquid nitrogen bath. The metal oxide nanoparticles of the present disclosure are envisioned to increase the surface are of the carbon nanotubes, thereby increasing their aromatic hydrocarbon adsorption efficiency. A minimum increase of 100% in the surface area of the carbon nanotubes is envisioned following metal oxide nanoparticle impregnation.

Nanoparticle and nanocomposite characterization is necessary to establish understanding and control of nanoparticle and nanocomposite synthesis, assembly and applications. In one embodiment, the metal oxide nanoparticles and nanocomposite are characterized by at least one instrument selected from the group consisting of a scanning electron microscope, a thermogravimetric analyzer, an X-ray diffractometer and an X-ray fluorescence spectrometer.

In another embodiment, it is envisioned that characterization is done using a variety of other techniques. Common exemplary techniques include, but are not limited to, electron microscopy (TEM), atomic force microscopy (AFM), dynamic light scattering (DLS), Fourier transform infrared spectroscopy (FTIR), matrix-assisted laser desorption/ionization time-of-flight mass spectrometry (MALDI-TOF), ultraviolet-visible spectroscopy, Rutherford backscattering spectrometry (RBS), dual polarization interferometry and nuclear magnetic resonance (NMR).

Carbon nanotubes exhibit strong adsorption affinities to a wide range of aromatic and aliphatic contaminants in water. The large adsorption capacity of CNTs for organic material is primarily due to their pore structure and their large hydrophobic surface areas. They show similar adsorption capacities as activated carbons in the presence of natural organic matter. Highly-purified metal-impregnated carbon nanotubes have advantageous properties and performance when compared to conventional approaches to water decontamination due to their ability to direct the selective uptake of aromatic hydrocarbon species based both on the nanotube's controlled pore size, high and increased surface area and ordered chemical structure. Thus, they are advantageous adsorbents for contaminant removal in water and wastewater treatment systems.

In one embodiment, the method of the present disclosure is designed for removing at least one aromatic hydrocarbon from an aqueous solution by contacting with the nanocomposite describe herein.

An aromatic hydrocarbon, or arene, or aryl hydrocarbon is a hydrocarbon with alternating double and single bonds between carbon atoms forming rings. The configuration of six carbon atoms in aromatic compounds is known as a benzene ring, after the simplest possible such hydrocarbon, benzene. Aromatic hydrocarbons can be monocyclic or polycyclic. Some non-benzene based compounds called heteroarenes, where at least one carbon atom is replaced by one of the heteroatoms oxygen, nitrogen or sulfur are also called aromatic compounds. The general properties of aromatic hydrocarbons are that they display aromaticity and that their carbon-hydrogen ratio is high. Commonly, they also undergo electrophilic substitution reactions and nucleophilic aromatic substitutions.

In a preferred embodiment, the method of the present disclosure is designed for removing an aromatic hydrocarbon from aqueous solution comprising at least one selected from the group consisting of benzene, toluene, ethyl benzene and xylene.

Benzene is an organic chemical compound with the chemical formula $C_6H_6$. Benzene is an aromatic hydrocarbon and a cyclic hydrocarbon with a continuous pi-bond. Benzene is a colorless and highly flammable liquid. It is mainly used as a precursor to heavy chemicals such as ethyl benzene and cumene. Its non-industrial applications are severely limited by benzene's carcinogenicity.

Benzene derivatives have from one to six substituents attached to the central benzene core. When there is more than one substituent present on the ring, their spatial relationship becomes important for which the arene substitution patterns ortho, meta and para are devised. For example there are three isomers of cresol ($C_7H_8O$) and six isomers of xylenol (($CH_3$)$_2C_6H_3OH$). In the present disclosure, benzene derivatives refer to all ortho, meta and para isomers and mixtures thereof.

Toluene is a colorless and water-insoluble liquid. It is a mono-substituted benzene derivative consisting of a $CH_3$ group attached to a phenyl group. It is an aromatic hydrocarbon with the IUPAC systemic name methylbenzene. Toluene is widely used as an industrial feedstock and as a solvent.

Ethyl benzene is an organic compound with the formula $C_6H_5CH_2CH_3$. It is a highly flammable, colorless liquid. This monocyclic aromatic hydrocarbon is important to the petrochemical industry as an intermediate in the production of styrene, the precursor to polystyrene.

Xylene, xylol or dimethylbenzene is an aromatic hydrocarbon mixture consisting of a benzene ring with two methyl groups at various substituted positions. The three isomers of xylene have the molecular formula $C_8H_{10}$, also represented by the semi-structural formula $C_6H_4(CH_3)_2$. Xylene is a major petrochemical produced by catalytic reforming and also by coal carbonization in the manufacture of coke fuel. It represents about 0.5-1% of crude oil.

Xylene exists in three isomeric forms. The isomers can be distinguished by the designations ortho (o-), meta (m-) and para (p-), which specify to which carbon atoms (of the benzene ring) the two methyl groups are attached. The o-isomer is 1,2-dimethylbenzene, the m-isomer is 1,3-dimethylbenzene, and the p-isomer is 1,4-dimethylbenzene. In the present disclosure, xylene may refer to xylene as the o-isomer, m-isomer, p-isomer or mixtures thereof.

"BTEX" is an acronym for benzene, toluene, ethyl benzene and xylenes. These compounds are some of the volatile organic compounds (VOCs) found in petroleum derivatives such as petrol (gasoline). Benzene is a known carcinogen and toluene, ethyl benzene and xylenes have harmful effects on the central nervous system. BTEX compounds are notorious due to the contamination of soil and groundwater with these compounds. Contamination typically occurs near petroleum and natural gas production sites, petrol stations and other areas with underground storage tanks or aboveground storage tanks, containing gasoline or other petroleum-related products. The amount of "total BTEX", the sum of the concentrations of each of the constituents of BTEX, is sometimes used to aid in assessing the relative risk or seriousness at contaminated locations and the need of remediation of such sites.

Polycyclic aromatic hydrocarbons (PAHs) are aromatic hydrocarbons that consist of fused aromatic rings and do not contain heteroatoms or carry substituents. Naphthalene is the simplest example of a PAH. PAHs occur in oil, coal and tar deposits and are produced as byproducts of fuel burning. They are of concern as pollutants because compounds have been identified as carcinogenic, mutagenic and teratogenic. In the present disclosure, aromatic hydrocarbons may refer to monocyclic arenes, polycyclic arenes, heteroarenes and mixtures thereof.

In addition to benzene, toluene, ethyl benzene and xylenes, it is envisaged that the present invention may be adapted to incorporate and increase the removal from aqueous solution of other aromatic hydrocarbons. Examples of other aromatic hydrocarbons include, but are not limited to, mesitylene, durene, 2-phenylhexane, biphenyl, styrene, naphthalene, phenol, aniline, nitrobenzene, benzoic acid, acetylsalicylic acid, paracetamol, picric acid, anthracene, phenanthrene, tetracene, chrysene, triphenylene, pyrene, pentacene, corannulene, coronene, ovalene, benzo[a]pyrene, benzo[ghi]perylene, acenaphthene, acenaphthylene, benzo[a]anthracene, benzo[e]pyrene, benzo[b]fluoranthene, benzo[j]fluoranthene, benzo[k]fluoranthene, dibenz[a,h]anthracene, fluoranthene, fluorine, indeno[1,2,3-cd]pyrene, phenanthrene and mixtures thereof.

In addition to benzene, toluene, ethyl benzene and xylenes, it is envisaged that the present invention may be adapted to incorporate and increase the removal from aqueous solution of other volatile organic compounds (VOCs). Examples of other volatile organic compounds (VOCs) include, but are not limited to, methyl tertiary butyl ether (MTBE), carbon tetrachloride, p-dichlorobenzene, trichloroethylene, vinyl chloride, 1,1,1-trichloroethane, 1,1-dichloroethylene, 1,2-dichloroethane, cis-1,2-dichloroethylene, monochlorobenzene, cholorobenzene, o-dichlorobenzene, tetrachloroethylene, trans-1,2-dichloroethylene, 1,2-dichloropropane, dichloromethane, 1,1,2-trichloroethane, 1,2,4-trichlorobenzene, perchloroethylene, chlorofluorocarbons, and mixtures thereof.

Methods for removing aromatic hydrocarbons according to the present invention include contacting the nanocomposite comprising metal oxide nanoparticle impregnated carbon nanotubes with aromatic hydrocarbon contaminated water sources and systems. These methods may be carried out in tanks, containers or small scale applications. The aromatic hydrocarbon is removed by adsorption, meaning the process is physical and preferably no chemical changes, such as oxidation, are made upon the aromatic hydrocarbon. Contacting is carried out any convenient and reasonable temperature lower than the boiling point of the aromatic hydrocarbon of interest at standard pressure.

There are many parameters in the method under which aromatic hydrocarbons are removed from the aqueous solution. Parameters such as contact time, agitation speed, and adsorbent dosages can be optimized and their impacts on removal efficiency noted.

In one embodiment, the treatment and contacting process may run for as long as 0.5-5 hours, preferably 1-5 hours, preferably 2-5 hours or 4 hours. The duration needs to be long enough to ensure sufficient contact time between adsorbent materials and aromatic hydrocarbon compounds. However, if the process is left to run too long, desorption may start to occur, resulting in bound aromatic hydrocarbon molecules being released from the metal oxide nanoparticle impregnated carbon nanotube materials.

In most instances, adsorption time requirements vary based on the nature of the interaction occurring between the adsorbent and the adsorbate. Generally, the adsorption by the nanocomposite of the aromatic hydrocarbon will increase with time, after which there is a slight and gradual decline in the adsorption. This is explained by the adsorption equilibrium phenomenon, in which the rate of adsorption is greater than the rate of desorption until equilibrium is reached at a certain contact time. At this time, the adsorption sites on the adsorbent are saturated. Beyond this time, the rate of desorption is greater than the rate of adsorption, accounting for the slight and gradual decline in aromatic hydrocarbon adsorption beyond an optimum time.

In one embodiment, it is envisioned that the method further comprises washing the nanocomposites free of the adsorbed aromatic hydrocarbon such that they can be recycled and/or reused in another contacting and removal.

In one embodiment, the method further comprises agitation of the aqueous solution. The agitation can encompass shaking, stirring, rotating, vibrating, sonicating, and other means of increasing contact between the adsorbent and adsorbate. Further, the agitation can be performed by hand or mechanically. In one embodiment, the treatment and contacting process may be enhanced by mechanical shaking or agitation. Agitations speeds of 50-350 rpm, preferably 75-300 rpm, preferably 100-250 rpm or 200 rpm may be introduced to the reaction in order to increase contact between adsorbent (nanocomposites) and adsorbate (aromatic hydrocarbons) materials. At agitation speeds, higher than 350 rpm it is possible adsorbent materials may volatilize.

As adsorption is the key mechanism of treatment in the present disclosure, a requirement is contact between the surface of the adsorbent material and the target adsorbate (aromatic hydrocarbons). There is generally an increase in the removal efficiency with increasing agitation speed until a certain level. The poor removal of aromatic hydrocarbons at lower agitation speeds is attributable to a lack of contact between the active adsorption sites of the nanocomposite and the aromatic hydrocarbon solution as adsorbents may have settled in the vessel the method is carried out in. Maintaining the speed below this certain level allows the minimization of loss by volatilization during the agitation process.

In one embodiment, before treatment an exemplary aqueous solution sample may have an aromatic hydrocarbon concentration of $10^{-9}$–1 ppm, preferably $10^{-6}$–1 ppm, preferably $10^{-5}$–1 ppm, preferably $10^{-3}$–1 ppm, preferably $10^{-2}$–1 ppm, preferably $10^{-1}$–1 ppm.

In one embodiment, effective adsorbent dosages for these aromatic hydrocarbon concentrations may be as low as 0.1 mg. The effective dosage of adsorbent per 1 ppm of aromatic hydrocarbon may be 10-200 mg/ppm, preferably 25-100 mg/ppm, preferably 25 mg/ppm, preferably 50 mg/ppm, preferably 75 mg/ppm, preferably 100 mg/ppm.

In one embodiment, at least 25% of the total mass of aromatic hydrocarbon may be removed from the aqueous solution by the treatment methods described herein, preferably at least 30%, preferably at least 35%, preferably at least 40%, preferably at least 45%, preferably at least 50%. It is especially preferred that at least 50%, more preferably 60%, more preferably 70%, more preferably 75%, more preferably 80%, more preferably 85%, more preferably 86%, more preferably 87%, more preferably 88%, more preferably 89%, more preferably 90% of the total mass of the aromatic hydrocarbon of an aromatic hydrocarbon contaminated sample is removed by adsorption of the aromatic hydrocarbon using the metal oxide nanoparticle impregnated carbon nanotube nanocomposite and treatment methods described herein.

As used herein, "effective at removing" refers to a nanocomposite that removes at least an amount corresponding to an amount described hereinabove.

In one embodiment, 30-50% of the total mass of the aromatic hydrocarbon is removed with a dosage of 25 mg of adsorbent per 1 ppm of aromatic hydrocarbon, preferably 50-60% of the total mass is removed with a dosage of 50 mg/ppm, preferably 50-80% of the total mass is removed with a dosage of 75 mg/ppm, preferably 60-90% of the total mass is removed with a dosage of 100 mg/ppm.

Adsorption of the aromatic hydrocarbon is significantly increased by the use of the metal oxide nanoparticle impregnated carbon nanotube nanocomposite in the present methods and treatments as opposed to substantially similar methods performed under substantially similar operating conditions with raw carbon nanotubes without metal oxide nanoparticles. This is substantially due to the increase in surface area and changes in pore sizes from the metal oxide nanoparticle impregnation. In one embodiment, at least 10% more of the total mass of aromatic hydrocarbon is removed from aqueous solution using nanocomposite adsorbent as opposed to raw carbon nanotube adsorbent, preferably at least 20% more of the total mass, preferably at least 30% more of the total mass, preferably at least 40% of the total mass of aromatic hydrocarbon is removed.

In one embodiment, 10-15% more of the total mass of aromatic hydrocarbon is removed with a dosage of 25 mg of nanocomposite adsorbent per 1 ppm of aromatic hydrocarbon compared to a dosage of 25 mg of raw carbon nanotube adsorbent per 1 ppm of aromatic hydrocarbon, preferably 10-20% more of the total mass is removed with a dosage of 50 mg/ppm, preferably 15-30% more of the total mass is removed with a dosage of 75 mg/ppm, preferably 20-40% more of the total mass is removed with a dosage of 100 mg/ppm.

In a preferred embodiment, the method described herein removes 90% of the total mass of the aromatic hydrocarbon benzene from a 1 ppm aqueous solution of benzene. In this embodiment, the contacting is performed for 4 hours with mechanical shaking agitation at 200 rpm. In this embodiment, the nanocomposite is 15% by weight aluminum oxide nanoparticle relative to the total weight of the nanocomposite and 85% by weight multi-walled carbon nanotubes. The metal oxide nanoparticles are impregnated on a surface and/or in pore spaces of the multi-wall carbon nanotubes. In this embodiment, an increase of 40% more of the total mass of benzene in the aqueous solution is removed compared to the same method performed in the same manner with raw multi-wall carbon nanotubes and without metal oxide nanoparticles.

According to a second aspect, the present disclosure relates to the nanocomposite itself for use in the methods for removing aromatic hydrocarbons from an aqueous solution of the present disclosure, in one or more of their embodiments. The nanocomposite is consistent with preceding descriptions herein. In one embodiment, the nanocomposite comprises carbon nanotubes present in at least 85% by weight relative to the total weight of the nanocomposite and nanoparticles comprising at least one metal oxide selected from the group consisting of aluminum oxide, zinc oxide and iron oxide which are present in up to 15% by weight relative to the total weight of the nanocomposite. The metal oxide nanoparticle are impregnated on a surface and/or in pore spaces of the carbon nanotubes and the nanocomposite adsorbs at least 25% of the total mass of an aromatic hydrocarbon selected from the group consisting of benzene, toluene, ethyl benzene and xylene from an aqueous solution.

In one embodiment, the use of this nanocomposite as an adsorbent leads to at least 10% more of the total mass of aromatic hydrocarbon being removed from aqueous solution as opposed to raw carbon nanotube adsorbent, preferably at least 20% more of the total mass, preferably at least 30% more of the total mass, preferably at least 40% of the total mass of aromatic hydrocarbon is removed.

In one embodiment, the raw carbon nanotubes have a BET surface area of at least 50 $m^2/g$, preferably at least 75 $m^2/g$, preferably at least 100 $m^2/g$, preferably at least 150 $m^2/g$, preferably at least 200 $m^2/g$, preferably at least 250 $m^2/g$. In one embodiment, the modification of carbon nanotubes with impregnated metal oxide nanoparticles may increase the BET surface area of the carbon nanotubes by at least 100%, preferably at least 125%, preferably at least 150%, preferably at least 175%, or preferably at least 200%. In one embodiment, the nanocomposite of metal oxide nanoparticle impregnated carbon nanotubes has a BET surface area of at least 100 $m^2/g$, preferably at least 125 $m^2/g$, preferably at least 150 $m^2/g$, preferably at least 200 $m^2/g$, preferably at least 225 $m^2/g$, preferably at least 250 $m^2/g$, preferably at least 275 $m^2/g$, or preferably at least 300 $m^2/g$.

In one embodiment, the nanocomposite can be envisioned to be used as material for membranes and filters for the application of the methods described herein, in one or more of their embodiments. The materials made out of the metal oxide nanoparticle impregnated carbon nanotube nanocomposite are envisioned to serve as switchable adsorbents with sieving, adsorption and permeation features the can be dynamically activated/deactivated by either pore size distribution, metal oxide nanoparticle loading (passive control) or external electrostatic fields (active control).

According to a third aspect, the present disclosure relates to a process for preparing the nanocomposite for use in the methods for removing aromatic hydrocarbons from an aqueous solution of the present disclosure, in one or more of their embodiments. The process is consistent with production of a nanocomposite consistent with preceding descriptions herein.

The process, described herein is characterized as wet chemistry and is considered simple and cost effective compared to other processes facilitating the binding, embedding or loading of metal oxide nanoparticles to the surface and pore spaces of carbon nanotubes. This process involves no pre-processing, surface-processing and/or coatings.

In one embodiment, raw carbon nanotubes are dispersed in an appropriate solvent including, but not limited to, acetone, ethanol, propanol or n-methyl-2-pyrrolidone until a substantially homogeneous suspension is formed.

In a preferred embodiment, the carbon nanotubes are multi-walled carbon nanotubes, single-walled carbon nanotubes, hybrid nanotubes or mixtures thereof.

In one embodiment, the dispersion does not contain a surfactant. The nanotubes may be dispersed using sonication to aid the formation of the dispersion. The sonication can be 10-60 minutes, preferably 15-45 minutes, more preferably 30 minutes. Additionally, inherent agglomeration prevention properties of the nanoparticles themselves may aid dispersion.

In another embodiment, if necessary surfactants can be used to aid dispersion. Surfactants are compounds that lower the surface tension (or interfacial tension) between two liquids or between a liquid and a solid. Surfactants may act as detergents, wetting agents, emulsifiers, foaming agents and dispersants. Surfactants are commonly used to better disperse solid nanoparticles in a fluid. They can also make the dispersion easier to process and stabilize the dispersion by inhibiting crystallization or precipitation of the nanocomposites. Suitable surfactants include amphoteric, cationic, anionic and nonionic surfactants. Examples of surfactants include ammonium lauryl sulfate, sodium lauryl sulfate (SDS, sodium dodecyl sulfate), sodium lauryl ether sulfate, sodium myreth sulfate, dioctyl sodium sulfosuccinate, perfluorooctanesulfonate, sodium stearate, octenidine dihydrochloride, cetyl trimethylammonium bromide (CTAB), 5-bromo-5-nitro-1,3-dioxane and the like.

Additionally, the dispersion of the present process may contain additional additives, to change the properties of the nanocomposites. In addition to a surfactant, one or more additives may include, but are not limited to, an antifoaming agent or defoamer, a scale inhibitor, a corrosion inhibitor, a colorant, a thermal stabilizer and a coolant additive.

Subsequently, the precursor of the metal oxide is dissolved in a suitable solvent such as acetone, ethanol, propanol or n-methyl-2-pyrrolidone. The metal oxide precursors are generally salt precursors such as chlorides and nitrate that can precipitate in water as the oxo-hydroxide form. Metal oxide precursors and nanoparticles and carbon nanotubes are added at specific mass ratios. In one embodiment, the ratio of carbon nanotubes to metal is 9:1, the ratio may be 8:2, 7:3, 6:4 or 5:5.

In a preferred embodiment, the metal oxide precursor is a salt precursor, more preferably the metal salt precursor comprises at least one selected from the group consisting of aluminum nitrate, iron nitrate and zinc nitrate.

This solution is then added, in some embodiments dropwise, to the dispersion of raw carbon nanotubes. The reaction is then performed and stirred, reaction conditions depend upon the type of metal oxide being impregnated. In some embodiments sonication is sufficient; the sonication can be 10-60 minutes, preferably 15-45 minutes, more preferably 30 minutes. In other embodiments heat may be necessary. Temperatures up to reflux include 100-225° C., preferably 120-200° C.

In one embodiment, the reaction mixture is then cooled to room temperature and filtered and washed at least once with suitable solvents such as deionized water and/or ethanol. The resulting nanocomposite is dried at elevated to sufficiently remove all solvent. Drying temperatures are in the range of 80-120° C., preferably 90-110° C., preferably 100° C. The length of drying can be affected by the choice and amount of solvent.

In one embodiment, the final step involves calcining the nanocomposite at various temperatures and for different times. In one embodiment, calcination is performed at 200-400° C. for up to 8 hours, preferably 250-400° C. for up to 6 hours, preferably 300-400° C. for up to 4 hours, preferably 350° C. for 4 hours. The end product consists of carbon nanotubes coated, embedded, or impregnated with nanoparticle metal oxide for use in the methods of removing aromatic hydrocarbons from aqueous solution in one or more of their embodiments described herein.

In one embodiment, the method described herein is a liquid-solid and/or solid-solid transformation. These are the most broadly used in order to control morphological characteristics with certain chemical versatility and follow a "bottom-up" approach. A number of specific techniques and methods have been developed including co-precipitation methods, sol-gel processing relying on hydrolysis of alcoxides in alcohol solution, microemulsion techniques, solvothermal methods, and template/surface derivatized methods.

In addition, gas-solid transformation method are envisioned including, but not limited to, chemical vapor deposition (CVD) processes such as metalorganic, plasma-assisted, thermally activated/pydrolytic and photo CVD methodologies and multiple-pulsed laser deposition.

In addition to the present process, it is envisaged that the process for producing metal oxide impregnated carbon nanotubes for the adsorptive removal of aromatic hydrocarbons may be adapted to incorporate other techniques. Examples of other techniques to synthesize metal oxide carbon nanotube composites include, but are not limited to, hot pressing of composite powder, pressureless sintering technique, direct in-situ growth, in-situ chemical vapor deposition (CVD) synthesis route, pulsed laser deposition, high-intensity ultrasonic radiation method, assembling presynthesized metal oxide nanoparticles as building blocks on CNTs, spontaneous formation of metal oxide nanoparticles on CNTs, thermal decomposition of metal oxide precursors directly onto the surface of carbon nanotubes, hydrothermal crystallization, sol-gel followed by spark plasma sintering process, surfactant wrapping sol-gel method, chemical precipitation and controlled heteroaggregation method.

The examples below are intended to further illustrate protocols for preparing and characterizing nanocomposites comprising metal oxide nanoparticle impregnated carbon nanotubes, and uses thereof. Further they are intended to illustrate assessing these adsorbent materials for aromatic hydrocarbon removal efficiency described herein, and are not intended to limit the scope of the claims Example 1

Chemicals

Commercial multiwall carbon nanotubes were purchased from "Times Nano" with purity of greater than 95% by weight and an outer diameter of approximately 10-20 nm. Other chemicals which include iron nitrate, aluminum nitrate, zinc nitrate, ethanol, benzene (99.7% purity), nitric acid (>69% purity) and sodium hydroxide of analytical grade, were purchased from Sigma Aldrich and utilized directly without any further treatment or purification in the embodiments described herein.

Example 2

Preparation of Adsorbent Materials

For impregnation of metal oxide nanoparticles on multi-walled carbon nanotubes (MWCNTs) the required amount of MWCNTs was weighed and dissolved in a sufficient amount of ethanol solvent and ultra-sonicated for half an hour to deagglomerate and disperse the MWCNTs in the solvent. An appropriate amount (10% weight based) of metal salt (aluminum nitrate, iron nitrate, zinc nitrate) was dissolved in a sufficient amount of ethanol, added to the MWCNTs solution and sonicated for a further half an hour. The sample was then shifted to an oven for drying at 90° C. After complete drying of ethanol, the sample was placed in a furnace and calcined at 350° C. for 4 hours.

Example 3

Characterization of Adsorbents

The adsorbents were analyzed using various characterization techniques. Physical morphology and structure analysis was carried out using a scanning electron microscope (SEM) and thermogravimetric analysis (TGA) was carried out using TGA equipment in order to check the weight percent and purity of the carbon nanotubes.

Figure 1B:
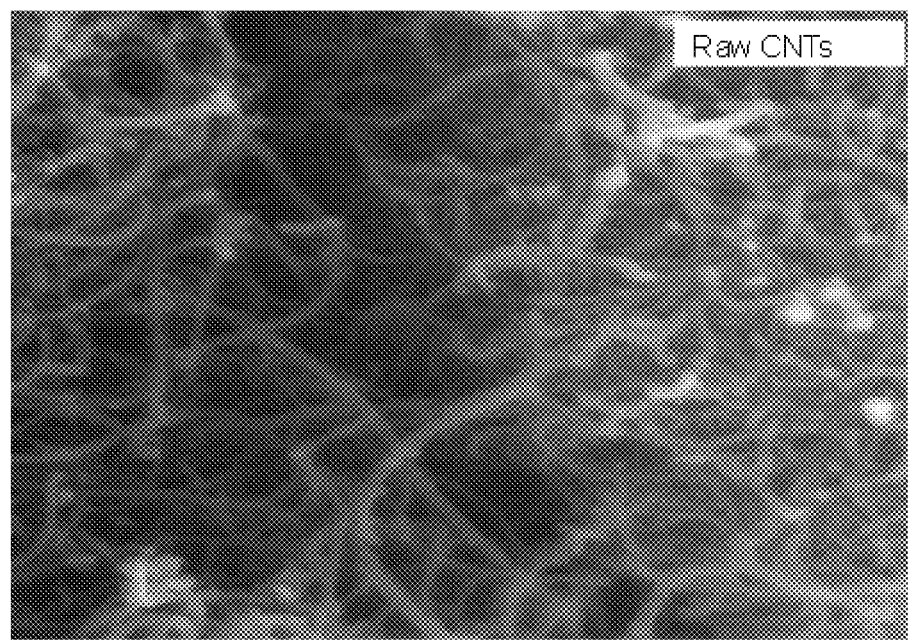
FIG. 1B is a SEM micrograph of the magnified view of raw MWCNTs.
Figure 1C:
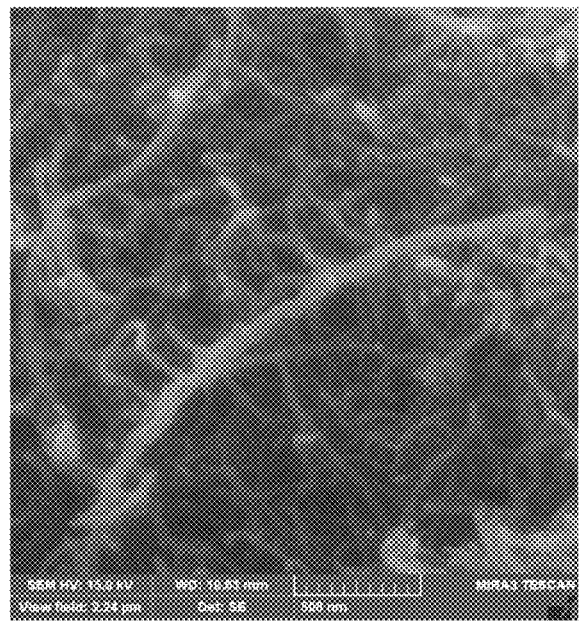
FIG. 1C is a SEM micrograph of aluminum oxide nanoparticle impregnated MWCNTs.
Figure 1D:
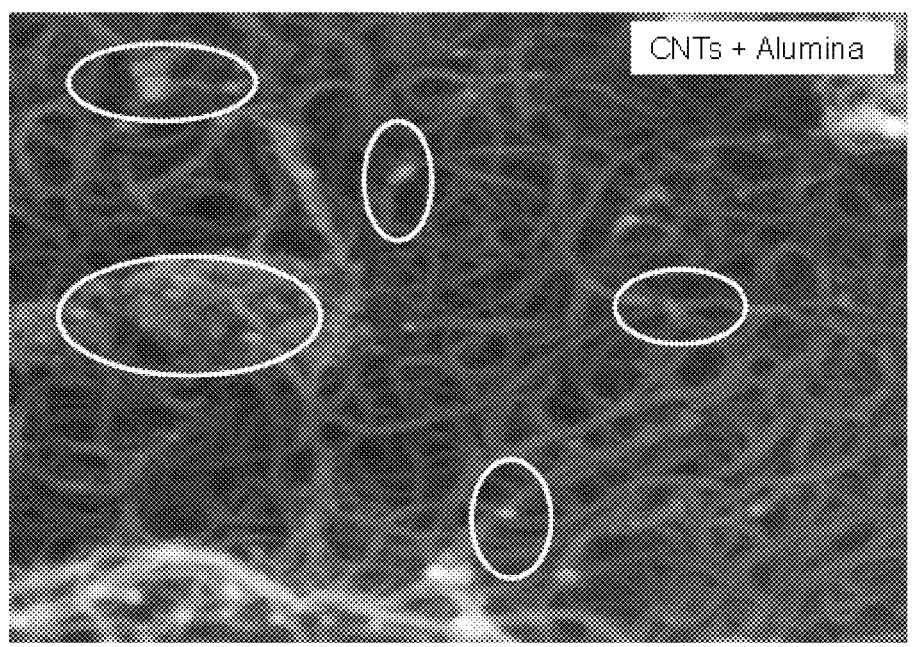
FIG. 1D is a SEM micrograph of the magnified view of aluminum oxide nanoparticle impregnated MWCNTs.
Figure 1E:
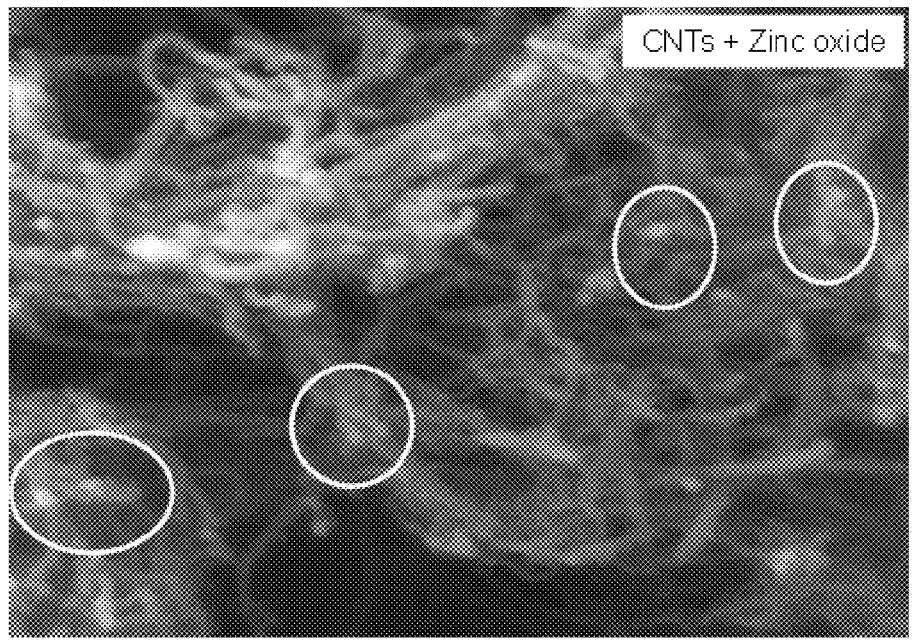
FIG. 1E is a SEM micrograph of the magnified view of zinc oxide nanoparticle impregnated MWCNTs.
Figure 1F:
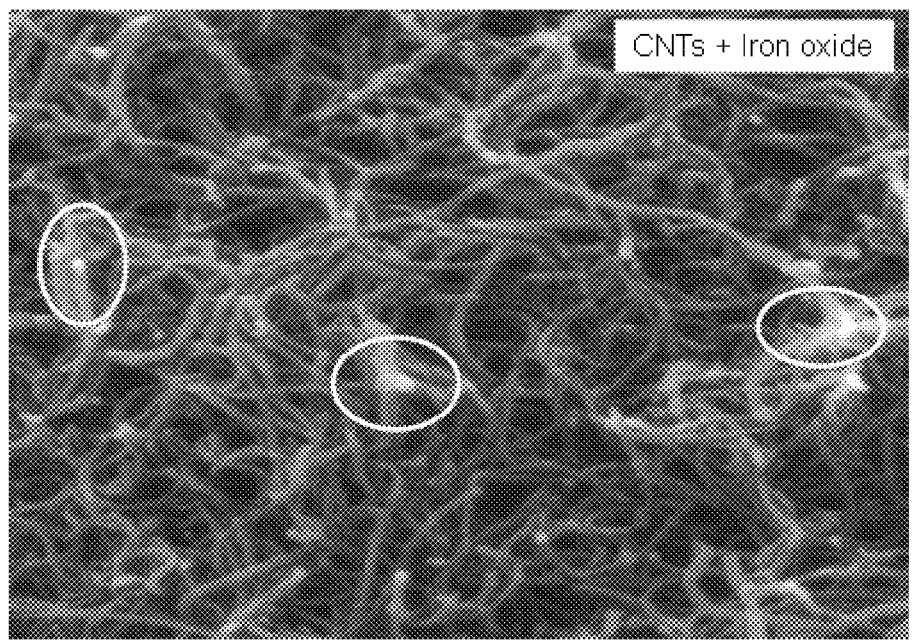
FIG. 1F is a SEM micrograph of the magnified view of iron oxide nanoparticle impregnated MWCNTs.
Figure 3A:
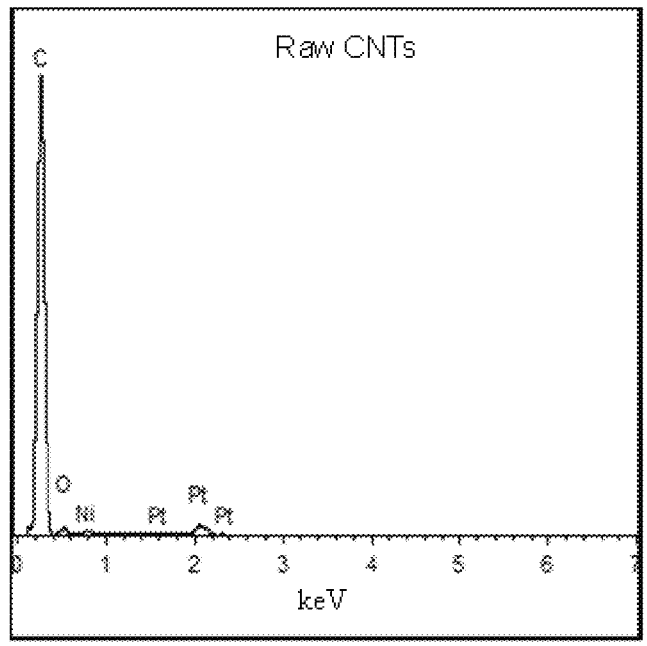
FIG. 3A is an energy dispersive X-ray (EDX) analysis of raw MWCNTs.
Figure 3B:
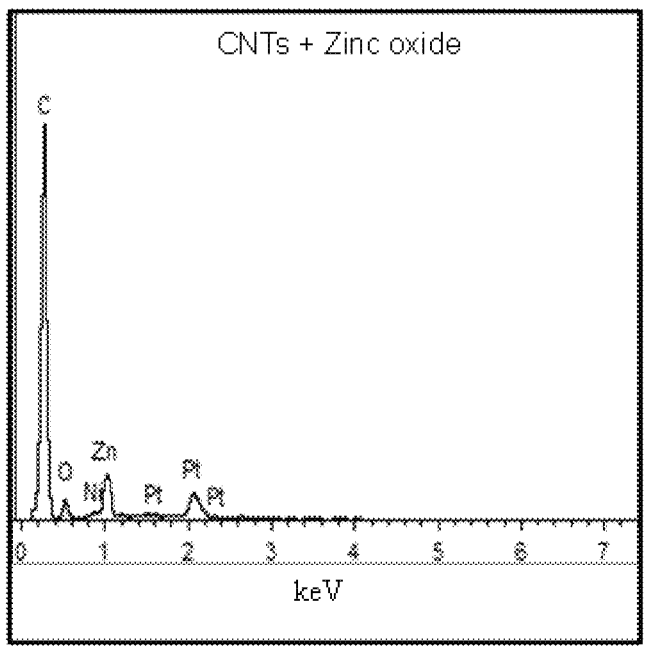
FIG. 3B is an EDX analysis of zinc oxide nanoparticle impregnated MWCNTs.
Figure 3C:
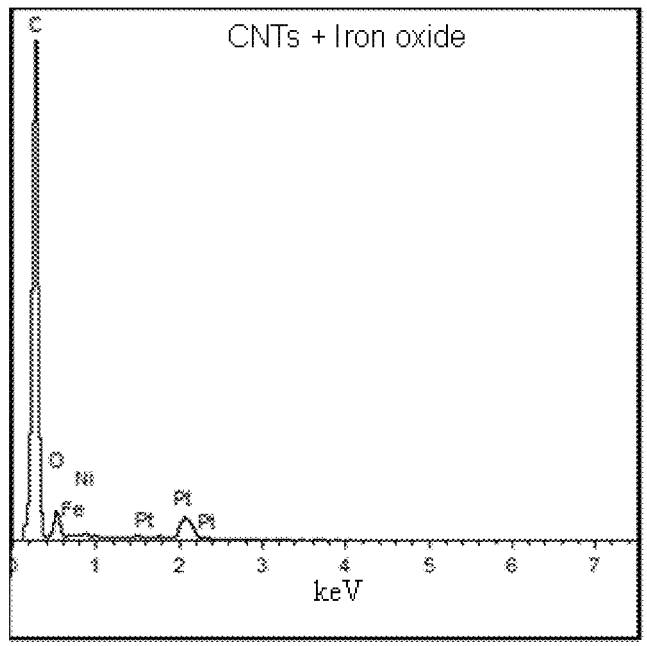
FIG. 3C is an EDX analysis of iron oxide nanoparticle impregnated MWCNTs.
Figure 3D:
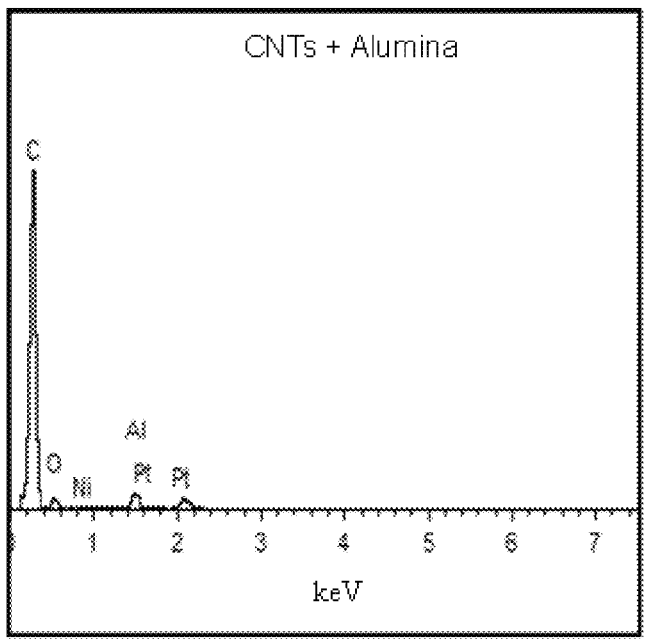
FIG. 3D is an EDX analysis of aluminum oxide nanoparticle impregnated MWCNTs.

The SEM images of both raw MWCNTs (FIG. 1A and FIG. 1B), aluminum oxide nanoparticle (approximately 1-15 nm) impregnated MWCNTs (FIG. 1C and FIG. 1D), zinc oxide nanoparticle impregnated MWCNTs (FIG. 1E) and iron oxide nanoparticle impregnated (FIG. 1F) are presented. It is observed that the surface of raw MWCNTs was smooth but more agglomerated as shown in FIG. 1A and FIG. 1B. In FIG. 1C and FIG. 1D aluminum oxide nanoparticle clusters can be observed along with decreased agglomeration of the MWCNTs. Energy dispersive X-ray (EDX) analysis further confirms the loading of raw MWCNTs (FIG. 3A) with the aluminum oxide nanoparticles (FIG. 3D), with zinc oxide nanoparticles (FIG. 3B) and with iron oxide nanoparticles (FIG. 3C).

Figure 2A:
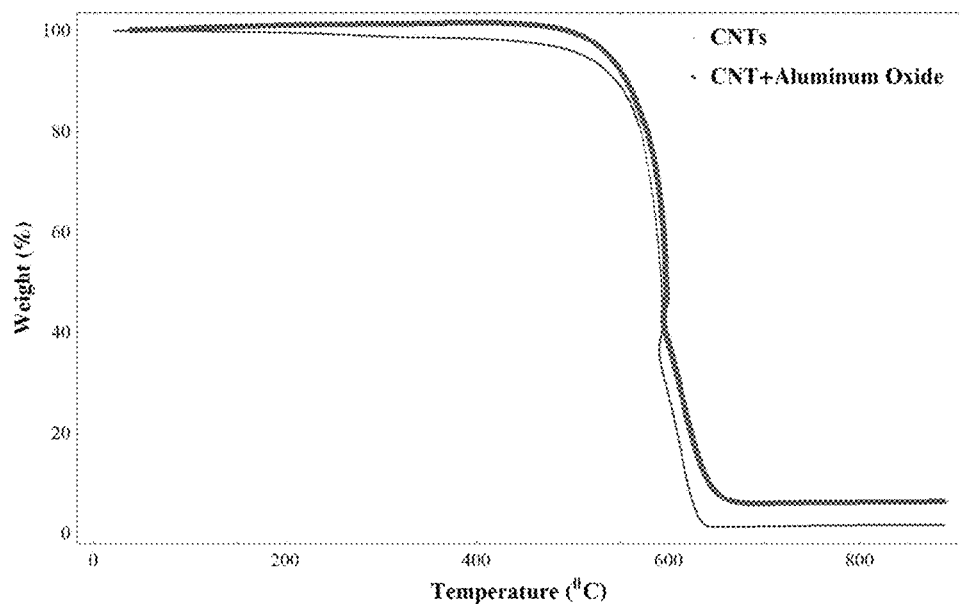
FIG. 2A is a thermal gravimetric analysis (TGA) of raw and modified MWCNTs impregnated with aluminum oxide nanoparticles.
Figure 2B:
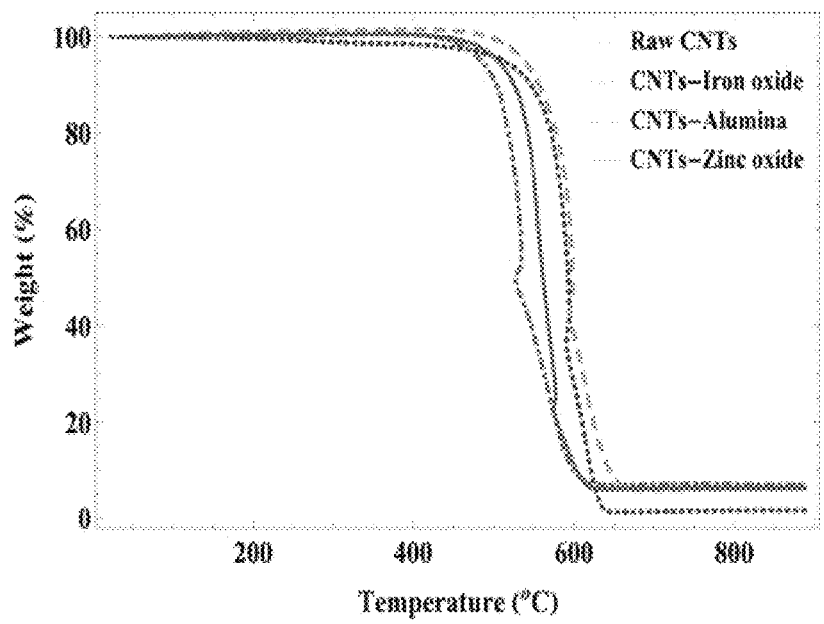
FIG. 2B is a thermal gravimetric analysis (TGA) of raw MWCNTs and modified MWCNTs impregnated with aluminum oxide nanoparticles, impregnated with iron oxide nanoparticles and impregnated with zinc oxide nanoparticles.

FIG. 2 indicates the TGA of both raw and aluminum oxide nanoparticle impregnated MWCNTs. It is observed that the residual weight percentage of ash at the end of analysis was higher for aluminum oxide nanoparticle impregnated MWCNTs as compared to raw MWCNTs. The ash residue was analyzed using EDX to confirm the presence of aluminum oxide in the sample along with nickel substrate used for growing MWCNTs. The SEM and TGA results support the significant claim of the preparation of this novel material. The adsorbent nanocomposite was found to have a BET surface area of 195-225 $m^2/g$, and increase of the used raw MWCNTs which have a BET surface area of less than 150 $m^2/g$.

Example 4

Adsorption Experiments

For batch adsorption experiments, a solution of benzene with the concentration of 100 ppm was prepared. In order to prepare the necessary solution at 1 ppm concentration, the 100 ppm solution was diluted to achieve the required concentration. Glass flasks containing adsorbents were filled completely (130 mL) with the benzene solution and were mounted on a shaker for a specific time (4 hours) and with shaking (200 rpm) at room temperature. After completion of the provided contact time, samples were removed from the shaker and filtered to collect samples for analysis of concentration.

The concentration of the benzene solution was determined using gas chromatography and mass spectrometry (GC 7890A and MS 5975C, Agilent Inc. USA). GC-MS headspace auto multi-sample was used for sample injection. Solution pH was varied from 3-8 by using a 1 molar solution of nitric acid and a 1 molar solution of sodium hydroxide.

The adsorption capacity of benzene on carbon nanotubes (CNTs) surface was calculated by the following relation:

$$q = \frac{(C0 - C)}{m} * V$$

where:
q=adsoprtion capacity (mg/g)
$C_0$=initial concentration of benzene in sample (mg/L)
C=final concentration of benzene in sample (mg/L)
V=volume of the sample (mL)
m=amount of adsorbent (g)

Percentage removal was found using the following relation:

$$\text{Removal (\%)} = \frac{C0 - C}{C0} * 100$$

Figure 4:
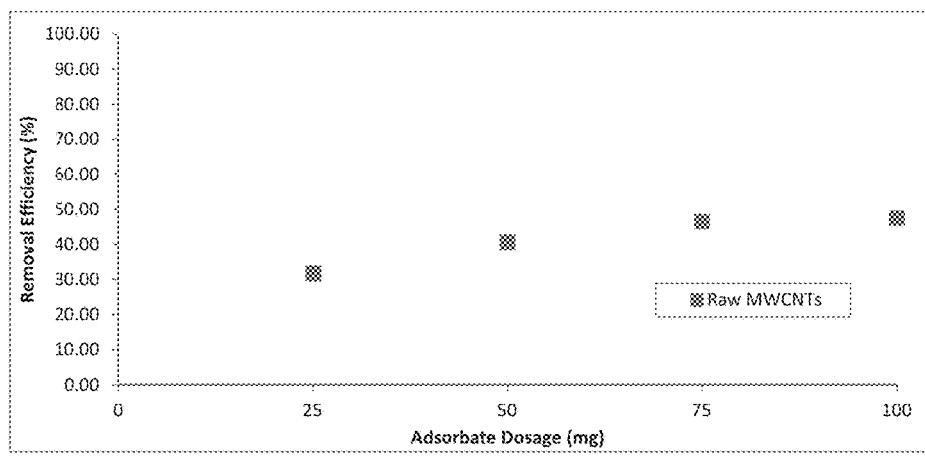
FIG. 4 illustrates the effect of dosage on removal efficiency for raw MWCNTs.

FIG. 4 provides the removal efficiency of raw MWCNTs. It is clear from this figure that by increasing the amount of adsorbent dosage, removal efficiency (%) increased. Maximum removal was achieved using 100 mg of adsorbent.

Figure 5:
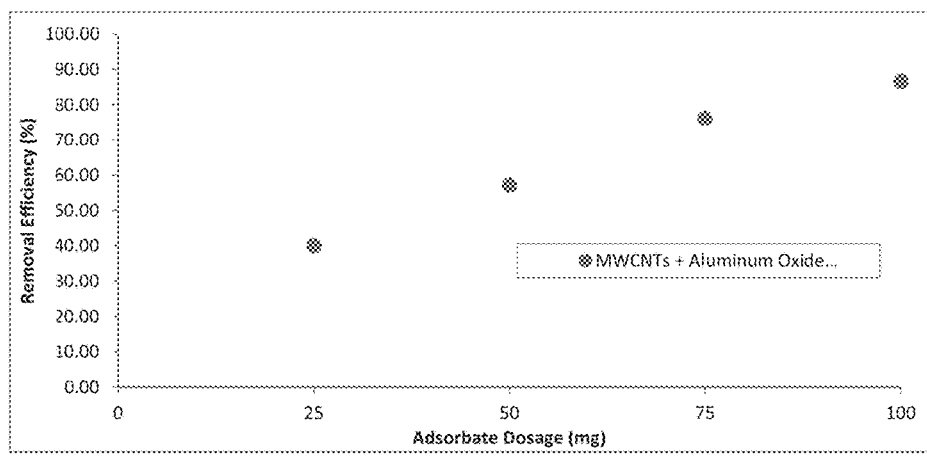
FIG. 5 illustrates the effect of dosage on removal efficiency for aluminum oxide nanoparticle impregnated MWCNTs.

FIG. 5 represents the removal efficiency of aluminum oxide nanoparticle impregnated MWCNTs. It can be seen that removal efficiency of benzene increased with increasing amounts of adsorbent. The removal efficiencies of aluminum oxide impregnated MWCNTs were higher than the raw MWCNTs for the same dosage. Maximum removal was achieved using 100 mg of adsorbent. The results shown in the figures are especially noteworthy. Even at relatively high dosages of metal oxide on the MWCNT a greater amount of aromatic hydrocarbons is absorbed in comparison to the metal oxide particle free MWCNT. In some respects this is counterintuitive. The presence of metal oxide particles on the surfaces of the MWCNTs may otherwise be viewed as taking adsorptive surface area from the MWCNTs. The examples show, however, that even at high levels of metal oxide particle dosing, the total adsorption capability of the MWCNT is increased in comparison to MWCNT that does not have metal oxide particles adsorbed thereon.

Figure 6:
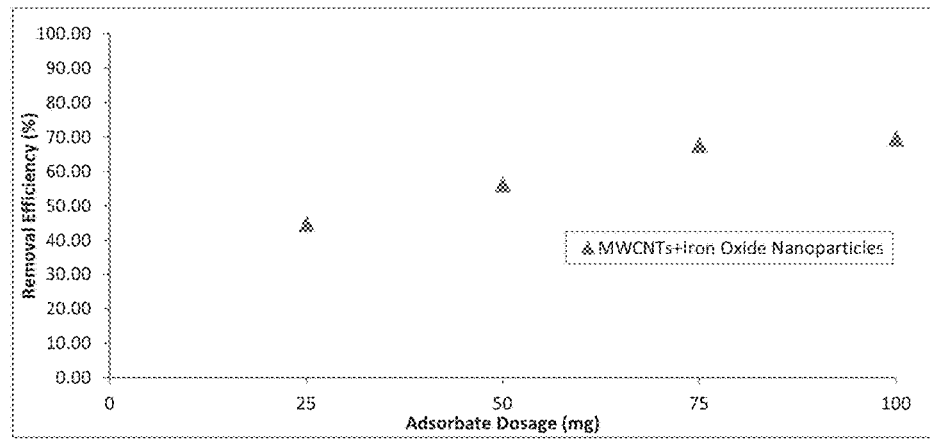
FIG. 6 illustrates the effect of dosage on removal efficiency for iron oxide nanoparticle impregnated MWCNTs.

FIG. 6 represents the result for removal efficiency of iron oxide nanoparticle impregnated MWCNTs. In this case again removal efficiency was higher than the raw MWCNTs for similar dosages. Here maximum removal of about 70% was achieved.

Figure 7:
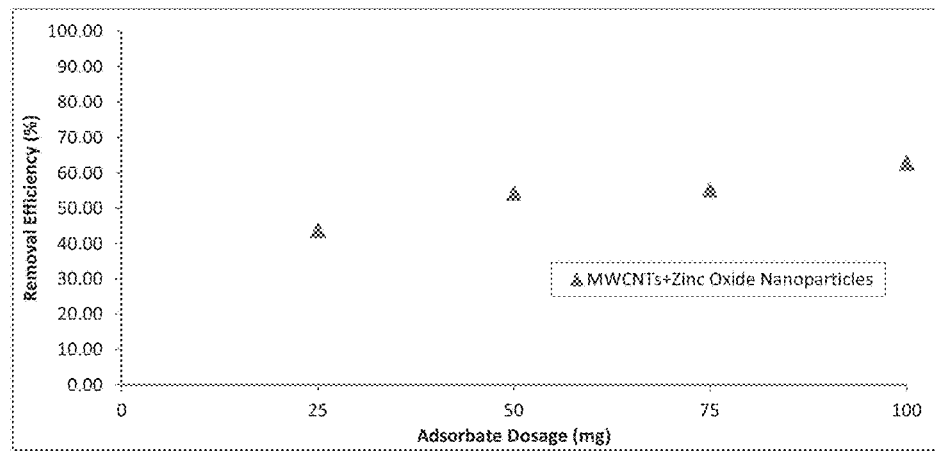
FIG. 7 illustrates the effect of dosage on removal efficiency for zinc oxide nanoparticle impregnated MWCNTs.

FIG. 7 illustrates the removal efficiency of zinc oxide nanoparticle impregnated MWCNTs. Here the removal efficiency was lower than iron oxide and aluminum oxide nanoparticle impregnated MWCNTs, but was still higher than raw MWCNTs. Here maximum removal achieved was about 63%. The significant improvement in removal efficiency of metal oxide nanoparticle impregnated MWCNTs over raw MWCNTs is evident in all three cases.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for removing benzene from an aqueous solution, comprising;
    contacting a nanocomposite comprising multi walled carbon nanotubes having an average outer diameter of 10-20 nm and an average inner diameter of 1-10 nm and aluminum oxide nanoparticle clusters with the aqueous solution to adsorb the benzene from the aqueous solution,
    wherein the aluminum oxide nanoparticle clusters are impregnated on an outer surface and/or in pore spaces of the multi walled carbon nanotubes.

2. The method of claim 1, wherein the multi walled carbon nanotubes are present in the nanocomposite in at least 85% by weight relative to the total weight of the nanocomposite and the aluminum oxide nanoparticle clusters are present in the nanocomposite in up to 15% by weight relative to the total weight of the nanocomposite.

3. The method of claim 1, wherein the aluminum oxide nanoparticle clusters comprise aluminum oxide nanoparticles having an average particle size of 1-50 nm.

4. The method of claim 1, wherein the nanocomposite has a BET surface area of at least 100 $m^2/g$.

5. The method of claim 1, further comprising agitating the aqueous solution at a speed of 50-350 rpm during the contacting.

6. The method of claim 1, wherein at least 25% of the total mass of the benzene is removed from the aqueous solution.

7. The method of claim 1, wherein up to 90% of the total mass of the benzene is removed from the aqueous solution.

8. The method of claim 7, wherein the contacting is carried out for a time of up to 5 hours.

9. The method of claim 1, wherein the nanocomposite is effective at removing at least 25% of the total mass of the benzene from the aqueous solution in a dosage of 10-200 mg per 1 ppm of benzene.

* * * * *